United States Patent Office 2,849,492
Patented Aug. 26, 1958

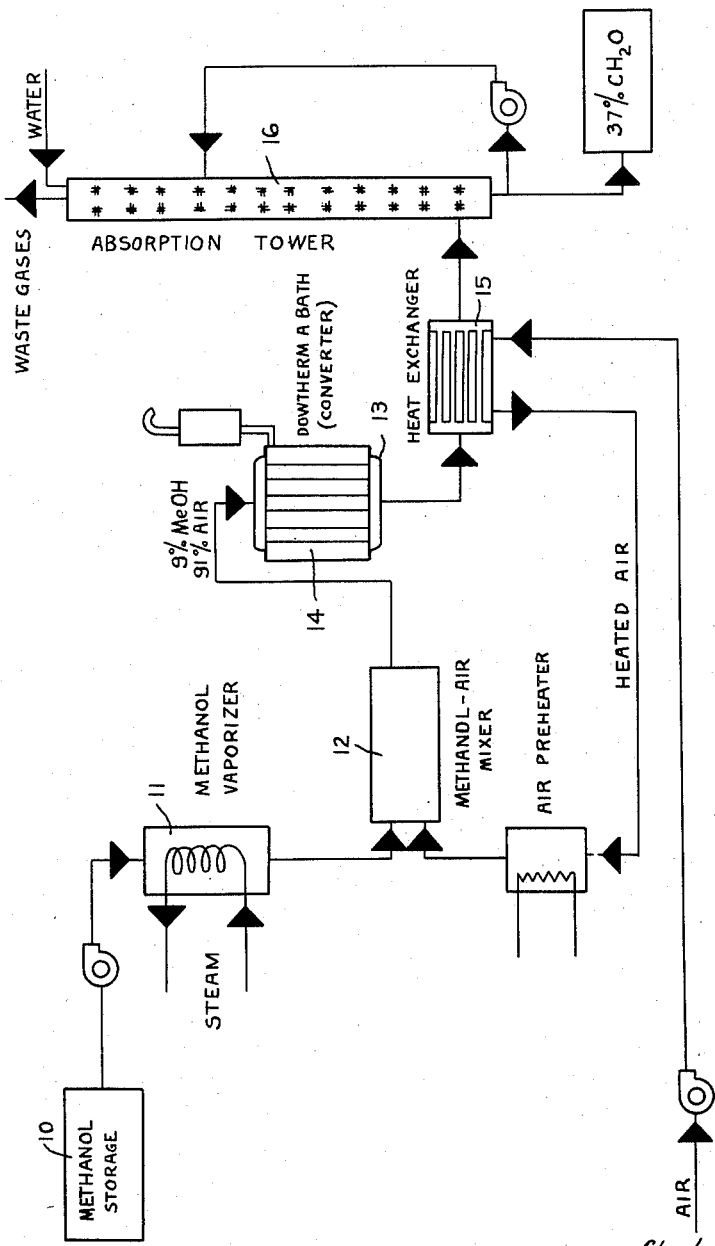

2,849,492

PROCESS FOR THE OXIDATION OF METHANOL TO FORMALDEHYDE USING UNSUPPORTED CATALYST

Charles L. Allyn, Eugene M. Barrentine, Theodore S. Hodgins, and Frederic J. Shelton, Seattle, and Ralph L. Rawson, Mercer Island, Wash., assignors to Reichhold Chemicals, Inc., Detroit, Mich.

Original application August 27, 1954, Serial No. 452,684, now Patent No. 2,812,309, dated November 5, 1957. Divided and this application May 23, 1957, Serial No. 666,498

1 Claim. (Cl. 260—603)

The invention relates to the production of formaldehyde by the catalytic oxidation of methanol, to the improved active catalyst for use in the production of formaldehyde, and the method of forming such catalyst from an inactive catalyst precursor, and especially to the inactive catalytic precursor and the method of producing the same.

The present application is a division of our application Serial No. 452,684, filed August 27, 1954, now U. S. Patent No. 2,812,309.

More particularly the invention relates to the production of an easily transported and stored catalyst precursor for the catalytic air oxidation of methanol to formaldehyde which is an improvement over the catalyst disclosed in U. S. Patent No. 1,913,405.

Our catalyst precursor is not in itself suitable for direct use as a catalyst in the formaldehyde production from methanol, but becomes a very efficient unsupported catalyst when converted to an active catalyst within the methanol converter. Heretofore, it has been necessary to prepare a catalyst at the site of use in order to cut down handling of a more or less fragile catalyst. For the first time in practicing our invention it is possible to prepare a catalyst precursor in one city and ship the stable catalyst precursor to a plant located in another city for final installation in the formaldehyde plant and conversion to an active catalyst.

We have discovered that the most efficient active catalyst must be converted from the catalyst precursor by a heating and blowing process after the catalyst precursor has been permanently placed within the methanol converter. The active catalyst is at best a fragile member and not nearly as satisfactory for handling in cross country shipping and storing as the catalyst precursor. The usual catalyst for the air oxidation of methanol to formaldehyde has been so fragile as to necessitate supporting the catalyst on a strong inert carrier. This problem was recognized early in the art as disclosed in lines 8 to 14 of U. S. Patent No. 1,913,405. In this same patent, lines 71 to 74, reference is made to the use of a high pressure to thoroughly compact the unsupported catalyst during preparation prior to the final drying stage of one to three days at substantially 100° C. in order to provide the necessary strength to withstand the rigors of use. The unsupported catalyst produced by the process of U. S. Patent No. 1,913,405 is not as suitable in handling and storage as is the catalyst precursor prepared by our process.

We have found that a stable easily transported and handled catalyst precursor may be prepared by reacting a water soluble iron salt with a water soluble molybdate salt under certain carefully controlled conditions. Any soluble iron salt may be used except those iron salts whose anions form strong complexes with iron in solution. Salts such as ferric chloride, ferric bromide, ferric acetate, ferric sulfate, ferrous chloride, ferrous acetate and the like may be used. Water soluble salts made from iron and organic acids may be used as well as salts from inorganic acids.

Any soluble molybdate salt such as ammonium molybdate, potassium or sodium molybdate or the like may be used. Molybdate salts of organic amines that are water soluble are suitable. It is only desirable that the salt produced along with the iron molybdate in a double decomposition be soluble, so that it may be washed away from the precipitated iron molybdate with ease.

We believe that the presence of certain metallic elements in trace amounts does no harm to the overall working of the catalyst. Elements which have been found non-harmful in trace amounts in our finished catalyst precursor are aluminum, calcium, chromium, cobalt, magnesium, nickel, and silicon. By trace amounts we mean less than about 0.001% by weight. These elements are not necessary for the activity of our catalyst since we have prepared catalyst precursors of satisfactory properties from carefully purified iron and molybdate raw materials.

We have found that the best unsupported catalyst precursor from the standpoint of storage stability and mechanical strength permitting handling is made from the double decomposition of ferric chloride and ammonium molybdate. The active catalyst made from this precursor not only is highly efficient in converting methanol to formaldehyde but retains a goodly portion of the mechanical strength of the precursor, thus reducing the development of objectionable catalyst fines during the catalytic oxidation of methanol to formaldehyde. The development of fines by abrasion of the packed unsupported catalyst during use tends to plug the catalyst filled tubes in the methanol converter, thus decreasing the flow through the converter and finally necessitating complete shutdown of the plant and replacement of expensive catalyst.

The active catalyst prepared from our inactive precursor does not over oxidize the methanol to carbon monoxide, carbon dioxide or formic acid. Only minor amounts of these materials are formed and little or no methylal is made. Typical results obtained with our catalyst having a $MoO_3$ to $Fe_2O_3$ ratio of 8.1:1 prepared by our procedure are as follows: From 100 pounds of methanol fed, 89 pounds of formaldehyde are produced, 0.1 pound formic acid is produced, 1 pound of carbon monoxide is produced, 2.9 pounds of carbon dioxide are produced, essentially no methylal is produced, and 1.0 pound of methanol remains unconverted. The products obtained and the amount of the various products obtained can be varied over a wide range by variations in the operating conditions. The following is an example of the preparation of our catalyst precursor:

*Example I*

An iron oxide-molybdenum oxide catalyst precursor was prepared in glass lined equipment as follows:

(1) 39.7 pounds of technical grade molybdenum trioxide (90% $MoO_3$) were added to 1030 pounds of a 2.9% aqueous solution of sodium hydroxide with rapid stirring to dissolve all the $MoO_3$. The temperature of the solution increased to about 140–160° F. during the addition of the molybdenum trioxide to the caustic solution.

(2) The resulting sodium molybdate solution was filtered while hot to remove the undissolved material. The remaining solids (essentially silicon dioxide and ferric hydroxide) were discarded.

(3) Sufficient concentrated reagent grade HCl (12 Normal) was added to bring the pH of the sodium molybdate solution down to 5.0. This solution was labeled solution A.

(4) 20.0 pounds of reagent grade ferric chloride (FeCl$_3$.6H$_2$O) were dissolved in 1000 pounds of water and labeled solution B. The pH of this solution was measured and found to be 1.7.

(5) Solution A was added to solution B with rapid stirring.

(6) The precipitate was allowed to settle then the supernatent liquid siphoned off.

(7) The precipitate was washed with 1000 pounds of cold water.

(8) The precipitate was again allowed to settle and then the wash water was siphoned off.

(9) The precipitate was then run to the filter and as much water as possible was removed by vacuum filtration. Filter cakes were allowed to build up to 1.5 inches in thickness—a satisfactory thickness for further drying—before removal from the filter.

(10) Upon removal from the filter the cakes were placed on ventilated racks and air dried for five days at room temperature.

(11) Further drying consisted of the following:
  (a) 48 hours at 175° F.
  (b) 72 hours at 225° F.
  (c) Filter cakes turned over and broken up into chunks 1 mesh or less in size, then dried for 24 hours at 300° F.

(12) This dried precipitate—having a moisture content of about 13.4% and containing about 15.5% Fe$_2$O$_3$—was comminuted to −6+10 mesh to yield about 20 pounds of catalyst precursor.

(13) This catalyst precursor was loaded into a converter consisting of a series of 1″ O. D. 13 gauge boiler tubes operating in parallel. The catalyst tubes are surrounded by a heat transfer medium to enable the heat treatment of the catalyst. The catalyst precursor was poured into the tubes without any tamping to a depth of 20 inches. The heat transfer medium was then gradually warmed up from room temperature to approximately 200° F. and air was gently blown through at a space velocity of 25 per minute. The temperature of the heat transfer medium was then raised slowly over a period of 3 hours from 200° F. to 500° F. and held at that temperature until no further trace of water was detected in the exhaust gas. A convenient method used to determine the absence of water vapor in the exhaust gas is to allow the exhaust gas to impinge upon a cold polished metal mirror and note whether any condensation occurs. The absence of condensation was taken to indicate the absence of water in the exhaust gas.

The catalyst precursor has then been made into active catalyst possessing suitable physical properties to enable the long efficient production of formaldehyde.

A heated stream of methanol and air was then passed through the catalyst giving a high conversion of methanol to formaldehyde. A methanol-air mixture containing 8.3% by weight of methanol and with an air flow rate at standard conditions of 0.5 cubic feet per minute per catalyst tube, heated to 480° F. was passed through this active catalyst bed at a space velocity of 100 per minute to produce a yield of 85.7 pounds of formaldehyde gas for every 100 pounds of methanol fed. The hotspot temperature in the catalyst bed was 765° F. after 24 hours of operation.

*Example II*

An iron oxide-molybdenum oxide catalyst precursor was prepared in glass lined and porcelain equipment as follows:

(1) 25 pounds 2 ounces of C. P. grade ferric chloride (FeCl$_3$.6H$_2$O) were dissolved in 150 gallons of water initially at 70° F. The pH of the resulting solution was about 1.7.

(2) In a separate vessel 56 pounds 6 ounces of C. P. grade ammonium heptamolybdate

were dissolved in 100 gallons of water initially at 125° F.

The pH of the resulting solution was approximately 5.3. This pH was adjusted to 2.25 using about 12 pounds of C. P. hydrochloric acid (12 Normal).

(3) The ammonium molybdate solution was then added slowly with efficient rapid agitation to the ferric chloride solution, the total elapsed time being about 1 hour.

(4) The resulting greenish yellow precipitate was allowed to settle about 6 hours and the supernatent liquid siphoned off. The settled precipitate was then washed with coldwater in two separate portions of about 20 gallons apiece, the precipitate being allowed to settle four hours after each wash before siphoning off the wash water.

(5) The resulting slurry was then vacuum filtered to a cake thickness of 1.5 inches.

(6) The cakes were then dried according to the procedure of Example I, steps 10 and 11.

(7) The dried catalyst precursor was then comminuted to −8, +20 mesh.

(8) The catalyst precursor was then activated according to the same procedure as used in Example I, step 13.

Operating under the same conditions of air and methanol flow as used in Example I a yield of 79.6 pounds of formaldehyde gas was obtained for every 100 pounds of methanol fed. The hotspot temperature after 24 hours of operation was 840° F.

We have found that pH control of the iron and molybdate solutions to be combined is of fundamental importance and the pH range of the resulting solution which is useful for the precipitation of physically strong catalyst precursor is between a pH of 0.5 and a pH of 3.5. Optimum results may be obtained in the pH range from pH 2.0 to 3.5, but for best operation a pH of 2.25 is suggested. The normal pH range of ferric chloride is pH 1.5 to pH 2.1 (all pH values were determined with a Beckman pH meter, model N equipped with standard glass electrodes). The pH of sodium molybdate dissolved in water at a concentration of 3.31% by weight is about pH 7.2. We have found this pH to be too high to produce a satisfactory catalyst precursor of high strength and catalytic activity. We preferably add hydrochloric acid to adjust the pH of the sodium molybdate to pH 5. This step is very important since when the molybdate solution is added to the ferric chloride it has the beneficial effect of giving not only a precipitate which has satisfactory strength when dried, but the precipitate itself is very easily filtered compared with the precipitates made at solution pH's higher than pH 5. We do not know precisely why this is so but it is very probable that the nature of the complex molecule in solution is the determining factor. The effect of pH of the final solution on the nature of the precipitate formed is dramatically demonstrated by the change in volume of the settled precipitate and its color. Between a pH of 1.9 and 2.6 the volume of the settled precipitate goes through a maximum (this volume is not particularly changed on one week's standing). It is wholly unexpected that a precipitate having a maximum volume should show the ease of filtration that our catalyst precursor does and it appears that this physical state is at least partially responsible for the high strength and catalytic activity of our catalyst. Below a pH of about 1.0 the color of the precipitate becomes increasingly lighter and there is a tendency to separate into two distinct solid phases of different specific gravity and color. Above pH 1.0 no such separation has been observed and at pH's above about 3.5 the precipitate becomes increasingly yellow to brown in color. It is of interest to note that above pH 4.0 the color of the precipitate is distinctly reddish brown and slimy and has the appearance of containing a considerable amount of ferric hydroxide. According to theory, molybdate salts are quite complex molecules which are described by the physical chemist as polymolybdates, i. e. These salts behave in solution as if they were polymeric materials having considerable molecular weight. It is presumed that secondary valance forces or hydrogen bonding play a very important part in holding these molecular complexes together. It is well known that the character of the complex in solution is materially affected by the pH of the solution. The degree of hydration and the degree of ionization in the complex polyacid are apparently tied in intimately with pH change. We find that the ferric chloride solution has a pH which is naturally more acid than pH 3.5. Normally we find that it will range between pH 1.5 and about pH 2.1. On the other hand the pH of the molybdate solution is usually between pH 5.0 and pH 9.0. A solution of this pH cannot be used with a ferric chloride solution because the resulting precipitate is extremely difficult to filter and the strength of the finished catalyst precursor is impaired. We have found that a suitable pH for the molybdate solution as measured prior to the addition of the iron solution is between pH 2.25 and a pH 5.0; preferably the pH should be approximately 5.0. To achieve this pH we add an acid such as hydrochloride acid, hydrobromic acid or the like in such quantity as is necessary. For a typical molybdate solution containing 3.3 pounds of sodium molybdate dissolved in 96.7 pounds of water, which solution has a pH of 7.2 we find that about 2.0 pounds of concentrated HCl should be added to bring the solution pH to 5.0. In the preparation of the catalyst precursor it is generally advisable to add the molybdate solution to the iron solution in order to avoid localized areas of higher pH in the iron solution. The iron solution may be added to the molybdate solution but efficient mixing should then be used.

After the formation of the precipitated iron molybdate it is necessary to wash the precipitate to remove the bulk of the occluded soluble salts. The precipitate is then dried in any suitable drier which will permit drying without any unnecessary abrading and development of fines. A tray drier is entirely satisfactory. In carrying out the drying it is desirable to employ relatively low temperatures in the initial stages otherwise the precipitate will tend to fuse to a glass like material totally unsuited as a catalyst precursor. A minimum of 48 hours at 175° F. is recommended for a cake having a thickness of ½ to 2 inches. At the end of this initial drying period the water content of the filtered precipitate is approximately 15 to 25%. After the initial drying period the temperature of the dryer is raised to from 300° F. to 425° F. and the drying continued until the water content is preferably below 10 to 20%. At this point it is preferred to comminute the catalyst precursor to from 4 to 8 mesh by suitable grinding means and the drying continued until the water content is between 2 and 10%. This product is then cooled to room temperature and re-screened to remove fines and oversize material. The preferred 4 to 8 mesh material then is bagged and ready for shipment to formaldehyde plants around the country.

Useful catalyst procursors may be made having the mole ratio of $MoO_3$ to $Fe_2O_3$ of from 3.3:1 to 11.2:1. The specific gravity of the dried and sized precipitate, which is the catalyst precursor, may vary to between 3.10 and 3.92. The specific gravity has an important bearing on the mechanical strength of the catalyst precursor. When the specific gravity is below about 2.9, the catalyst precursor is too soft and has little or no mechanical strength. If the specific gravity of the catalyst precursor is above 4.3 it becomes fused and is rendered useless. The catalyst precursor which contains minor amounts of water and soluble salt impurities, such as ammonium salts if ammonium molybdate was used in the preparation of the iron molybdate, is placed in the methanol converter. Usually the catalyst chamber consists of a series of one or two inch tubes arranged in parallel.

An appropriate procedure for activating the catalyst precursor is as follows:

The converter containing catalyst precursor is heated in the absence of methanol up to between 200° F. and 300° F. at which time a mild stream of air (still containing no methanol) is continuously blown through the converter. This blowing and heating is continued until the temperature reaches 495° F. and until all traces of any impurities such as water and ammonia are gone before any methanol is fed. This is extremely important. We have found that the presence of water even in trace quantities in the catalyst at the time methanol comes in contact with it will cause the catalyst to become very fragile and turn to a brownish material which gives rise to excessive catalyst fines during operation. If impurities such as ammonia are present at the time methanol is turned into the converter for conversion to formaldehyde we have found that the efficiency of conversion goes down and to some extent methylal is produced.

Other methods of dehydration and ammonia removal may be employed. For example, air may be dehydrated by chemical or physical means using phosphorus pentoxide, calcium chloride, silica gel, or the like and the resulting air passed through the catalyst at a time and temperature sufficient to remove all the water and volatiles.

The development of catalyst fines is objectionable because they plug the catalyst tubes, increasing the resistance to flow through these tubes and thereby reducing the overall capacity of the converter to an uneconomic level. For example, a catalyst made according to U. S. Patent No. 1,913,405 and having a moisture content of about 15% after being dried at 105° C. for approximately 48 hours was loaded into a converter and a methanol air mixture identical with that of Example I was fed through the catalyst bed at a bath temperature identical with the bath temperature of Example I. Within 4 hours the pressure drop across the catalyst bed had increased from 10 pounds per square inch to 18 pounds per square inch—so high that operation was no longer possible.

Under the same circumstances our catalyst made from our catalyst precursor according to Example I showed a useful working life of 60 days before the pressure drop increased from 10 pounds per square inch to 15 pounds per square inch, necessitating shutdown for catalyst replacement.

A schematic flow sheet for the process for the production of formaldehyde from methanol is shown in the accompanying drawing. In this process methanol is pumped from a storage tank 10 to a steam heated vaporizer 11 and the methanol vapor and air are metered by means of standard orifice plate gas flow meters into the venturi mixing chamber 12 and the hot mixed methanol-air stream is fed through the catalyst bed contained in a series of 1 inch O. D. boiler tubes four feet long inside the converter 13. A Dowtherm heat exchange medium 14 surrounds the catalyst tubes of the converter. The reacted gases from the catalyst bed pass through a heat exchanger 15 preheating the entering air. The cooled formaldehyde containing gas is then run through an absorption tower 16 and the formaldehyde is absorbed in water to yield directly a commercial 37% formaldehyde solution containing less than 1% methanol and 0.02% formic acid.

The invention has been described in detail for the purpose of illustration but it will be obvious that numerous modifications and variations may be resorted to without departing from the spirit of the invention.

We claim:

A method of making formaldehyde which comprises passing methanol and an oxidizing gas through a converter at a superatmospheric temperature in the presence of a mixed molybdenum iron oxide oxidation catalyst formed within the converter by heating and air blowing an inactive catalyst precursor comprising a partially hydrated mass having a pH on the acid side, and consisting principally of a mixture of molybdenum and iron oxides in the molecular ratio of $MoO_3$ to $Fe_2O_3$ of from 3.3:1 to 11.2:1 having a specific gravity between 2.9 and 4.3 and a moisture content within the approximate range of 5% to 30%, the air blowing of the catalyst precursor being continued until substantially all traces of moisture are removed prior to introduction of the methanol into the converter.

No references cited.